US012167194B2

(12) United States Patent
Ma et al.

(10) Patent No.: US 12,167,194 B2
(45) Date of Patent: Dec. 10, 2024

(54) EAR PAD, EARMUFF COMPONENT, AND HEADSET

(71) Applicant: HUAWEI TECHNOLOGIES CO., LTD., Guangdong (CN)

(72) Inventors: Guozhen Ma, Shenzhen (CN); Rongrong Wu, Shenzhen (CN); Yong Zheng, Dongguan (CN); Yu Zhang, Shenzhen (CN); Chengxia Ji, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 17/827,719

(22) Filed: May 29, 2022

(65) Prior Publication Data

US 2022/0295172 A1 Sep. 15, 2022

Related U.S. Application Data

(63) Continuation of application No. PCT/CN2020/132719, filed on Nov. 30, 2020.

(30) Foreign Application Priority Data

Nov. 30, 2019 (CN) ........................ 201911217326.9

(51) Int. Cl.
*H04R 5/033* (2006.01)
*H04R 1/10* (2006.01)

(52) U.S. Cl.
CPC ......... *H04R 1/1083* (2013.01); *H04R 1/1008* (2013.01); *H04R 1/105* (2013.01)

(58) Field of Classification Search
CPC .......................... H04R 1/1008; H04R 2460/15
See application file for complete search history.

(56) References Cited

U.S. PATENT DOCUMENTS 2,622,159 A * 12/1952 Herman .............. H04R 1/1008 181/129
3,602,329 A * 8/1971 Bauer ...................... A42B 3/16 181/129

(Continued)

FOREIGN PATENT DOCUMENTS

CN 2168316 Y 6/1994
CN 2650740 Y 10/2004

(Continued)

*Primary Examiner* — Ryan Robinson
(74) *Attorney, Agent, or Firm* — HUAWEI TECHNOLOGIES CO., LTD.

(57) ABSTRACT

Embodiments provide an ear pad having an annular structure. The ear pad includes an inner layer and an outer layer covering the inner layer. The inner layer and the outer layer are separate of annular structures and are separated by a first medium layer. The inner layer coats a second medium layer. Acoustic impedance of the first medium layer is different from acoustic impedance of the inner layer and the outer layer. The ear pad is configured to close a front cavity space between a housing and an ear of a user, thereby preventing sound leakage and reducing external noise entering the ear of the user. Various ear pad embodiments provide a double-layer structure including the inner layer and the outer layer separated by the first medium layer.

19 Claims, 7 Drawing Sheets

(56) References Cited

U.S. PATENT DOCUMENTS

| | | | | | |
|---|---|---|---|---|---|
| 3,829,624 | A * | 8/1974 | Goodin | H04R 1/1058 | 381/374 |
| 4,572,324 | A * | 2/1986 | Fidi | H04R 1/1008 | 181/129 |
| 4,809,811 | A * | 3/1989 | Gorike | H04R 1/2834 | 381/372 |
| 4,856,118 | A * | 8/1989 | Sapiejewski | A61F 11/14 | 381/372 |
| 5,138,722 | A * | 8/1992 | Urella | H04R 1/1008 | D14/206 |
| 5,144,678 | A * | 9/1992 | Lenz | H04R 1/1041 | 381/384 |
| 6,412,593 | B1 * | 7/2002 | Jones | H04R 1/1008 | 181/134 |
| 8,111,858 | B2 * | 2/2012 | Sapiejewski | H04R 1/1083 | 381/372 |
| 8,467,539 | B2 * | 6/2013 | Sapiejewski | H04R 1/1008 | 381/371 |
| 8,651,229 | B2 * | 2/2014 | Franzen | A61F 11/14 | 381/372 |
| 9,438,980 | B2 * | 9/2016 | Huang | H04R 1/1083 | |
| 9,800,980 | B2 * | 10/2017 | Palmer | H04R 9/06 | |
| 10,187,716 | B1 * | 1/2019 | England | H04R 1/1058 | |
| 10,455,314 | B1 * | 10/2019 | Yang | H04R 1/1008 | |
| 10,469,939 | B1 * | 11/2019 | Tikander | H04R 1/1008 | |
| 10,653,016 | B1 * | 5/2020 | Sullivan | H05K 5/0217 | |
| 10,771,876 | B1 * | 9/2020 | Tikander | H04R 1/105 | |
| 11,044,542 | B2 * | 6/2021 | England | H04R 1/1083 | |
| 11,190,878 | B1 * | 11/2021 | Patel | G01N 21/3563 | |
| 2005/0273910 | A1 * | 12/2005 | Cozens | A42B 3/12 | 2/411 |
| 2007/0154046 | A1 * | 7/2007 | Mishan | H04R 1/1083 | 381/370 |
| 2008/0128198 | A1 * | 6/2008 | Du | A61F 11/14 | 181/129 |
| 2009/0110226 | A1 * | 4/2009 | Ishida | H04R 1/1008 | 381/370 |
| 2010/0128884 | A1 * | 5/2010 | Sapiejewski | H04R 1/1008 | 381/371 |
| 2010/0158301 | A1 * | 6/2010 | Kuhtz | H04R 1/1008 | 381/374 |
| 2013/0087404 | A1 * | 4/2013 | Peskar | B32B 27/08 | 181/129 |
| 2013/0329933 | A1 * | 12/2013 | Kolton | H04R 1/1008 | 381/371 |
| 2014/0079270 | A1 * | 3/2014 | Essabar | H04R 1/1008 | 381/370 |
| 2019/0069065 | A1 * | 2/2019 | Brace | H04R 1/1008 | |
| 2019/0215594 | A1 * | 7/2019 | Staton | H04R 1/1008 | |
| 2019/0238968 | A1 * | 8/2019 | Hajati | H04R 5/033 | |
| 2019/0378385 | A1 * | 12/2019 | Biggs | H04R 1/1091 | |
| 2022/0086551 | A1 * | 3/2022 | Lagler | H04R 1/1091 | |
| 2022/0239998 | A1 * | 7/2022 | Karp | H04R 1/1008 | |
| 2023/0053043 | A1 * | 2/2023 | Madsen | H04R 1/105 | |
| 2023/0336908 | A1 * | 10/2023 | Freire | H04R 1/1008 | |

FOREIGN PATENT DOCUMENTS

| | | | | | |
|---|---|---|---|---|---|
| CN | 201887919 | U | | 6/2011 | |
| CN | 101420646 | B | | 6/2012 | |
| CN | 203086675 | U | | 7/2013 | |
| CN | 103905946 | A | * | 7/2014 | A61F 11/14 |
| CN | 102224742 | B | | 8/2014 | |
| CN | 205144868 | U | | 4/2016 | |
| CN | 105635886 | A | | 6/2016 | |
| CN | 106412738 | A | | 2/2017 | |
| CN | 206389511 | U | | 8/2017 | |
| CN | 107484053 | A | * | 12/2017 | |
| CN | 108605180 | A | | 9/2018 | |
| CN | 109246510 | A | | 1/2019 | |
| EP | 3414918 | B1 | * | 10/2020 | G10K 11/162 |
| IN | 103079136 | A | | 5/2013 | |
| JP | S464462 | Y1 | | 2/1971 | |
| JP | S51142390 | A | | 12/1976 | |
| JP | S5359817 | U | | 5/1978 | |
| JP | 2006270964 | A | | 10/2006 | |
| JP | 2009105841 | A | | 5/2009 | |
| JP | 2010010984 | A | | 1/2010 | |
| JP | 2010062732 | A | | 3/2010 | |
| JP | 2022058943 | A | * | 4/2022 | H04R 1/1008 |
| WO | WO-9748296 | A1 | * | 12/1997 | A61F 11/14 |

* cited by examiner

EAR PAD, EARMUFF COMPONENT, AND HEADSET

CROSS-REFERENCE TO RELATED APPLICATIONS

This application is a continuation of International Application No. PCT/CN2020/132719, filed on Nov. 30, 2020, which claims priority to Chinese Patent Application No. 201911217326.9, filed on Nov. 30, 2019. The disclosures of the aforementioned applications are hereby incorporated by reference in their entireties.

TECHNICAL FIELD

This application relates to the field of consumer electronic product technologies, and in particular, to an electronic device for audio processing.

BACKGROUND

In a use process of a headset, if noise in a surrounding environment is great, severe interference is caused for a sound signal inside the headset. Therefore, it is usually expected to well isolate the noise in the surrounding environment so that a user is not affected when listening to an audio signal by using the headset.

To reduce impact of external noise, an existing headphone can achieve good noise reduction performance by combining active noise reduction and passive noise reduction. The active noise reduction is mainly considered from a software algorithm aspect, and the passive noise reduction is mainly considered from headset structure design and material selection aspects. In a structure of the entire headphone, an ear pad part is used as a buffer for preventing a headset housing from being in direct contact with a head of a user, and is further used to seal space between the housing and an ear of the user, to be used as an important barrier for isolating external noise. A material and a structure design of the ear pad directly affect a passive noise reduction capability of the headphone. How to improve a noise reduction capability of the headphone by using the material and the structure design of the ear pad is a problem to be urgently resolved at present.

SUMMARY

In view of this, embodiments of this application provide a noise reduction ear pad, a noise reduction earmuff component, and a noise reduction headset, to reduce impact of noise in an external environment on sound quality of a headset.

The following describes this application from a plurality of aspects. It is easy to understand that implementations of the plurality of aspects may be mutually referenced.

According to a first aspect, an embodiment of this application provides an ear pad. The ear pad is of an annular structure, the ear pad includes an inner layer and an outer layer covering the inner layer, and the inner layer and the outer layer are separately of annular structures. The inner layer and the outer layer are separated by a first medium layer, and the inner layer coats a second medium layer. Acoustic impedance of the first medium layer is different from acoustic impedance of the inner layer and the outer layer. In the ear pad provided in the below embodiments of this application, a double-layer structure including the inner layer and the outer layer is separated by the first medium layer. Compared with a conventional ear pad, a noise reduction capability of the ear pad is significantly improved, and in particular, a noise reduction capability of the ear pad at a medium/high frequency is significantly improved.

According to a first aspect, in a possible implementation, the ear pad further includes a bracket, the bracket includes a contact member, and the contact member is in contact with the inner layer or the outer layer. The bracket is used, so that the inner layer and the outer layer can be fastened (secured), and a thickness of a first medium between the inner layer and the outer layer can be adjusted.

According to the first aspect, in a possible implementation, the outer layer includes a first outer layer part and a second outer layer part, and all areas or some areas of the first outer layer part or the second outer layer part cover the inner layer. A covering area is selected, so that a noise reduction degree can be controlled.

According to the first aspect, in a possible implementation, the outer layer includes a first outer layer part and a second outer layer part, the inner layer includes a first inner layer part, and the first outer layer part covers the first inner layer part.

According to the first aspect, in a possible implementation, the outer layer includes a first outer layer part and a second outer layer part, the inner layer includes a first inner layer part and a second inner layer part, the first outer layer part covers the first inner layer part, and the second outer layer part covers the second inner layer part.

According to the first aspect, in a possible implementation, a thickness of the first medium layer does not exceed 10 times a thickness of the inner layer or a thickness of the outer layer. When the thickness of the first medium layer is at least 10 times the thickness of the inner layer or the thickness of the outer layer, sound energy is reflected and dissipated on an interface of different media at a high proportion, so that a passive noise reduction effect is good.

According to the first aspect, in a possible implementation, acoustic impedance of the inner layer or the outer layer is at least 10 times the acoustic impedance of the first medium layer. Therefore, in a propagation process, noise arrives at an ear after passing through a plurality of layers of media. Because of an acoustic impedance mismatch between different media, a reflection capability on a medium interface is enhanced, thereby enhancing sound isolation of the ear pad, and improving a passive noise reduction effect.

According to the first aspect, in a possible implementation, acoustic impedance of the inner layer or the outer layer is at least 1000 times the acoustic impedance of the first medium layer. Therefore, in a propagation process, noise arrives at an ear after passing through a plurality of layers of media. Because of an acoustic impedance mismatch between different media, a reflection capability on a medium interface is enhanced, thereby enhancing sound isolation of the ear pad, and improving a passive noise reduction effect.

According to the first aspect, in a possible implementation, there is one inner layer or there are two or more inner layers, and every two adjacent layers are separated by a third medium layer. As a layer quantity increases, sound energy is reflected and dissipated on an interface of different media at a high proportion, thereby improving a passive noise reduction effect.

According to the first aspect, in a possible implementation, the first medium layer or the third medium layer is air. Air is selected as the first medium layer or the third medium layer, so that sound energy is reflected and dissipated on an interface of different media at a high proportion, and a process complexity is also not improved.

According to the first aspect, in a possible implementation, the inner layer or the outer layer is in contact with the bracket in a hot pressing or bonding manner. The inner layer or the outer layer is in contact with the bracket in the hot pressing or bonding manner, so that the inner layer or the outer layer is fastened (secured), and a spacing between the inner layer and the outer layer can also be controlled.

According to a second aspect, an embodiment of this application provides an earmuff component. The earmuff component includes an ear pad and a housing, the earmuff component includes the ear pad according to any one of the first aspect and the possible implementations of the first aspect, the ear pad includes an inner layer and an outer layer, and a bottom part of the ear pad is fastened (secured) to the housing.

According to a third aspect, an embodiment of this application provides an earmuff component. The earmuff component includes an ear pad and a housing, the earmuff component includes the ear pad according to any one of the first aspect and the possible implementations of the first aspect, the ear pad includes an inner layer, an outer layer, and a bracket, and the inner layer and the outer layer are fastened (secured) to a front cavity wall, a rear cavity wall, or a partition plate of a headset by using a fastener of the bracket.

According to a fourth aspect, an embodiment of this application provides a headset. The headset includes a headband and headset receiving ends connected to two ends of the headband, and the headset receiving end includes the ear pad according to any one of the first aspect and the possible implementations of the first aspect.

BRIEF DESCRIPTION OF DRAWINGS

FIG. 4(*b*) is a schematic diagram of transmission of a sound wave through a single-layer noise reduction ear pad;

FIG. 4(*c*) is a sound absorption coefficient vs frequency diagram of single-layer, double-layer, and three-layer noise reduction headsets;

Figure 1:
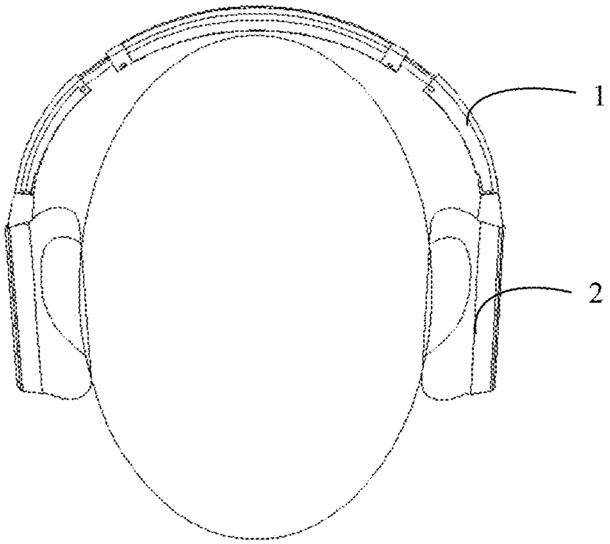
FIG. 1 is a schematic three-dimensional diagram of a headphone according to Embodiment 1 of this application.

Reference characters of components depicted in the figures are as follows:

Headband 1; earmuff component 2; housing 21; driver 22; diaphragm 221; front cavity 23; front cavity housing 231; rear cavity 24; rear cavity housing 241; barrier plate 25; sound output port 251; additional rear cavity 26; additional rear cavity housing 261; partition plate 27; ear pad 29; ear pad top part 291; ear pad bottom part 292; outer surface side 293; inner surface side 294; bracket 295; fastener 2951; contact member 2952; first contact member 29521; second contact member 29522; outer layer 296; first outer layer part 2961; second outer layer part 2962; outer layer connecting place 2963; inner layer 297; first inner layer part 2971; second inner layer part 2972; first medium layer 298; and second medium layer 299.

DESCRIPTION OF EMBODIMENTS

A headset is also referred to as an earphone or an earpiece, and usually has two receiving ends, respectively correspondingly worn on two ears. The headset may receive an audio signal sent by a media player, and convert the audio signal into an audible sound wave by using a speaker close to the ear. The headset can be used to listen to a sound alone without affecting another person. The headset can also isolate a sound in a surrounding environment, and can be used in a noisy environment, for example, in a recording studio, during a journey, or during exercising, without being affected by noise in the surrounding environment. Therefore, for the headset, it is very important performance that the noise in the surrounding environment can be well isolated.

Figure 2:
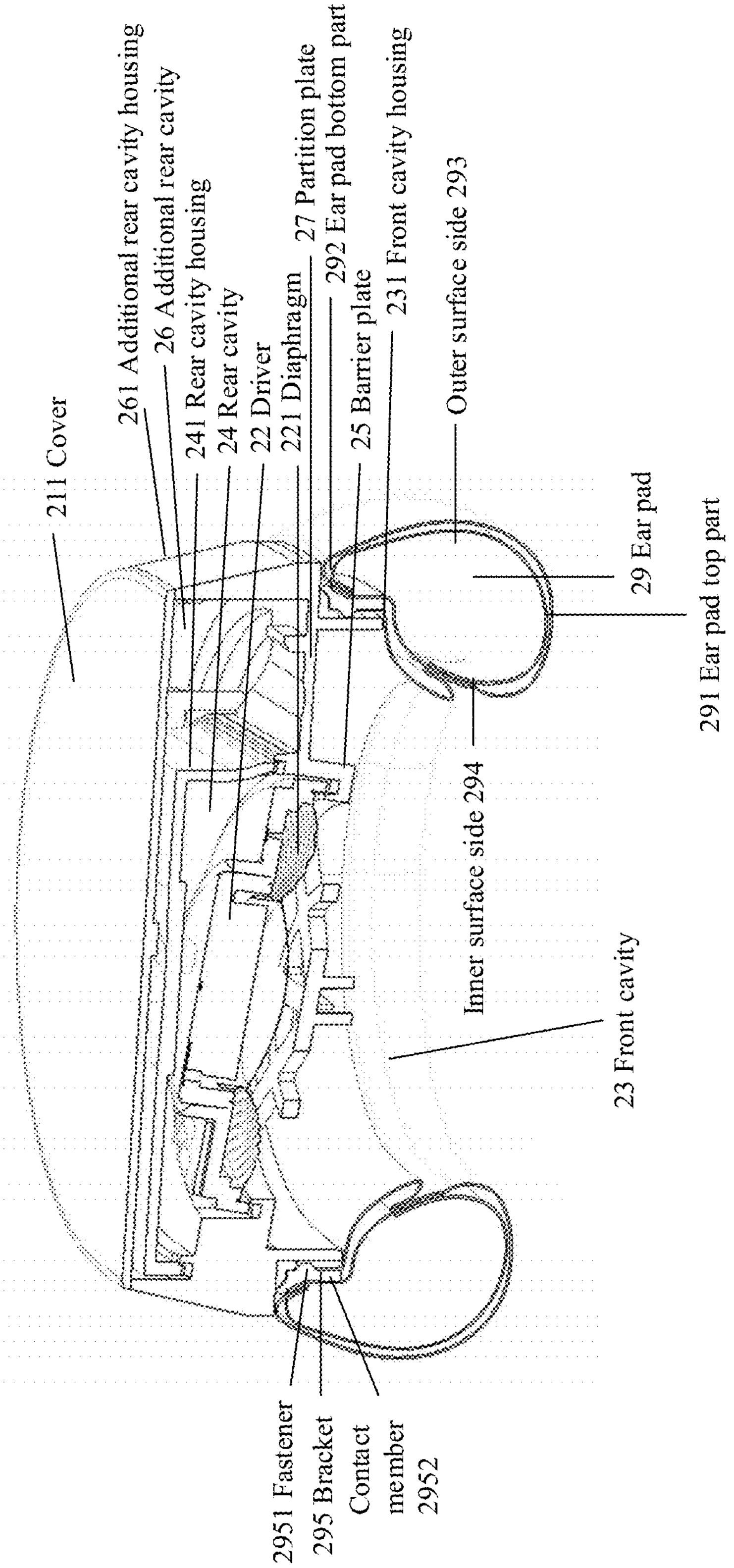
FIG. 2 is a partial cross-sectional view of an earmuff component according to Embodiment 2 of this application.

Usually, there are several types of headsets: a headphone, an in-ear earphone, or a semi-in-ear earphone. FIG. 1 is a schematic three-dimensional diagram of a headphone according to Embodiment 1 of this application. As shown in FIG. 1, the headphone usually includes a headband 1, earmuff components 2 connected to two ends of the headband 1, and a headset cable. The headband is worn on a head of a user. It should be noted that headset cables of several types of headsets such as a headphone, an in-ear earphone, or a semi-in-ear earphone may be omitted, and the headsets receive audio signals in a wireless communication manner, for example, by using Bluetooth. FIG. 2 is a partial cross-sectional view of an earmuff component according to Embodiment 2 of this application. As shown in FIG. 2, an earmuff component 2 is usually also referred to as a headset receiving end, and usually includes a housing 21 and an ear pad 29. Optionally, the earmuff component 2 may further include a driver 22 located inside the housing 21, and inner space of the housing 21 is isolated into a plurality of cavities. A cavity related to acoustic performance of the headset is a sound cavity, and one of cavities having little impact on the acoustic performance of the headset is a hardware compartment. The sound cavity may include a front cavity 23 and a rear cavity 24 that are disposed adjacent to each other, and the hardware compartment surrounds the outside of the rear cavity. A battery and a chip may be placed in the hardware compartment, and a circuit board may be further disposed in the hardware compartment. The hardware compartment is completely isolated from the rear cavity, and therefore has little impact on the acoustic performance of the headset.

The ear pad 29 surrounds a front cavity housing 231 of the front cavity 23, and a rear cavity housing 241 surrounds a side wall of the rear cavity 24. Neither the front cavity housing 231 nor the rear cavity housing 241 is disposed at a position at which the front cavity 23 intersects with the rear cavity 24. A diaphragm 221 of the driver 22 is located at the position at which the front cavity 23 intersects with the rear cavity 24. One surface of the diaphragm 221 faces the front cavity 23, and the other surface faces the rear cavity 24. Sound waves are transmitted to the front cavity 23 and the rear cavity 24 through vibration of the diaphragm 221. Other components of the driver 22 may be located in the front cavity 23, or may be located in the rear cavity 24. Because a sound wave in the front cavity 23 is delivered to an ear of the user, to avoid interfering with the sound wave in the front cavity 23, the other components of the driver 22 may be placed in the rear cavity 24, or disposed at the position at which the front cavity 23 intersects with the rear cavity 24.

The front cavity 23 may be isolated from the rear cavity 24 by using the driver 22. Alternatively, a barrier plate 25 may be disposed in the earmuff component, and the driver 22 is installed on the barrier plate 25, to isolate the front cavity 23 from the rear cavity 24 by using the barrier plate 25 and the driver 22.

An additional rear cavity 26 surrounds the outside of the rear cavity 24, and the additional rear cavity 26 is isolated from the rear cavity 24 by using the rear cavity housing 241. The rear cavity 24 and the additional rear cavity 26 are disposed through nesting, and the rear cavity 24 and an external environment are separated by the additional rear cavity 26. One side of the rear cavity 24 is adjacent to the front cavity 23, and the other side is adjacent to the additional rear cavity 26. The rear cavity 24 is surrounded by the front cavity 23 and the additional rear cavity 26. The front cavity 23 and the additional rear cavity 26 are disposed adjacent to each other, and are isolated from each other by using a partition plate 27. A portion of a side wall surrounding the additional rear cavity 26, other than the partition plate 27 and the rear cavity shell 241, is an additional rear cavity housing 261.

The front cavity housing 231 may be used as a part of the housing 21 of the headset, and the additional rear cavity housing 261 may also be used as a part of the housing 21. If the additional rear cavity 26 is not disposed, the rear cavity housing 241 may also be used as a part of the housing 21 of the headset.

The ear pad may be disposed on the peripheral of the front cavity housing 231, and the ear pad is in contact with an auricle of the user. The ear pad 29 may be fastened (secured) to the front cavity housing 231 in a bonding manner, a buckling manner, or the like. Space surrounded by the ear pad, the front cavity housing, the partition plate, and the barrier plate is the front cavity. The ear pad 29 may be divided into four parts based on relative positions: a part fastened (secured) to the housing 21, a part opposite to the housing 21 (that is, a part in contact with the ear of the user), an inner surface side 294 (that is, a side that is of the ear pad and that surrounds the ear of the user) of an annular structure, and an outer surface side 293 (that is, a side that is of the ear pad and that is in contact with an external environment) of an annular structure. The part fastened (secured) to the housing 21 is referred to as an ear pad bottom part 292, and the part opposite to the housing 21 is referred to as an ear pad top part 291. A bracket 295 may be disposed on the bottom part, and the bracket 295 includes a fastener and a contact member. The bottom part 292 of the ear pad may be directly fastened (secured) to the housing 21, or may be fastened (secured) to the housing by using the bracket 295. A contact member 2952 of the bracket is connected to an inner layer or an outer layer of the ear pad. A fastener 2951 of the bracket is fastened (secured) to the front cavity housing, the rear cavity housing, or the partition plate of the housing. The fastener 2951 of the bracket may be fastened to a front cavity wall, a rear cavity wall, or the partition plate in a buckling manner, a bonding manner, a magnet adsorption manner, a screw manner, or the like. The bracket may be of various shapes, for example, a cuboid, a cube, and another geometric body. Optionally, the periphery of a position at which the ear pad or the bracket is fastened (secured) to the housing may be sealed by using a sealing pad, to prevent sound leakage and reduce external noise entering the ear of the user. Headphones are mainly classified into an over-ear headphone and a supra-aural headphone. A main difference between the over-ear headphone and the supra-aural headphone is an earmuff component size. An earmuff component of the over-ear headphone may cover the auricle of the user. An earmuff component of the supra-aural headphone is smaller than the earmuff component of the over-ear headphone, the earmuff component of the supra-aural headphone presses against the ear, and the earmuff component of the supra-aural headphone mainly covers an outer ear.

Figure 3:
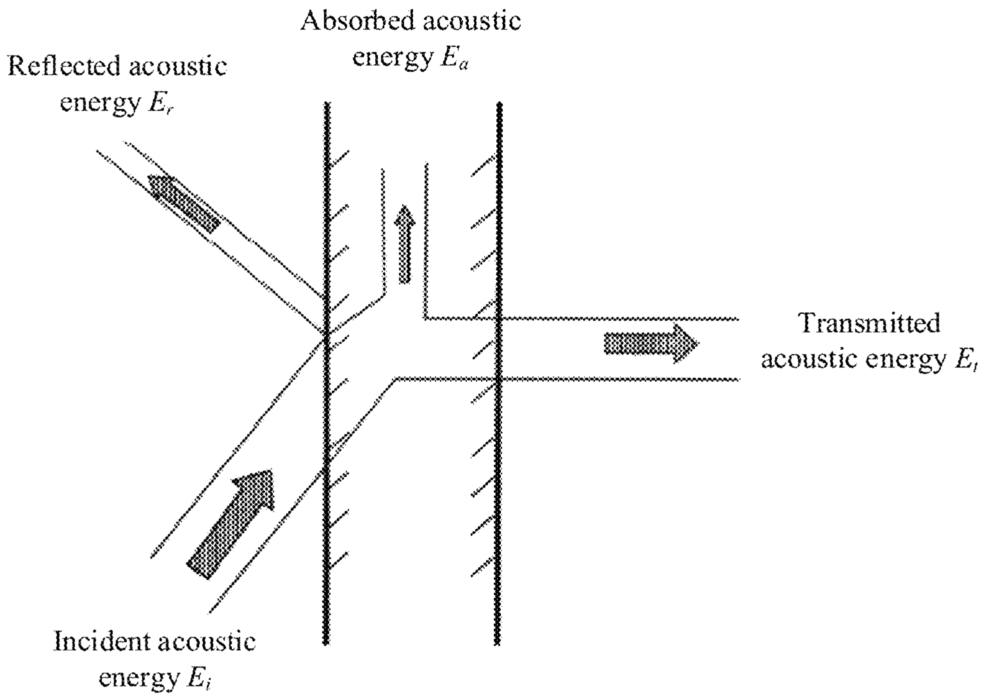
FIG. 3 is a schematic diagram of sound wave transmission according to this application.

The ear pad 29 is configured to prevent the housing 21 of the earmuff component 2 from being in direct contact with the head of the user, to play a buffering role, and the ear pad 29 is also configured to seal space between the housing and the ear of the user, to prevent sound leakage and reduce external noise entering the ear of the user. Specifically, a principle of reducing noise by using an ear pad is shown in a schematic diagram of sound wave transmission in FIG. 3. A sound wave propagates in a medium, and is reflected and transmitted after encountering an interface of another (second) medium. One part of energy of the sound wave is reflected back to the original medium, and the other part of energy is transmitted to the other (second) medium. Acoustic pressure and acoustic intensity of a reflected wave and a transmitted wave are related to characteristic impedance of the two media, a speed of sound, and an angle of the incident sound wave. Magnitude of reflection and transmission of a planar sound wave perpendicularly incident on an interface depends on only characteristic impedance of a medium. When there is an obvious difference between characteristic impedance of a medium 1 and characteristic impedance of a medium 2, most of sound energy is reflected. When a sound wave is incident on a surface of the ear pad, a part of incident acoustic energy is reflected on the surface of the ear pad, a part of the incident acoustic energy enters a material of the ear pad and is absorbed by the material of the ear pad, and a part of the incident acoustic energy enters an ear canal of the user through the ear pad. As shown in FIG. 3, when the earmuff component isolates and absorbs external noise as much as possible, the external noise enters the ear canal of the user as little as possible.

Figure 4A:
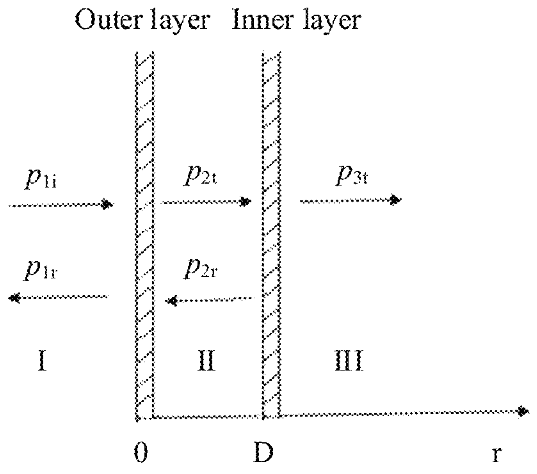
FIG. 4(*a*) is a schematic diagram of transmission of a sound wave through an inner layer and an outer layer of a double-layer noise reduction ear pad.
Figure 4B:
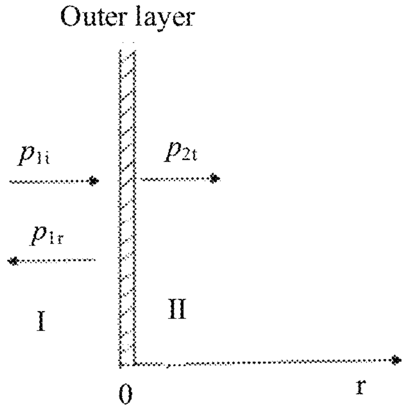
Figure 4C:
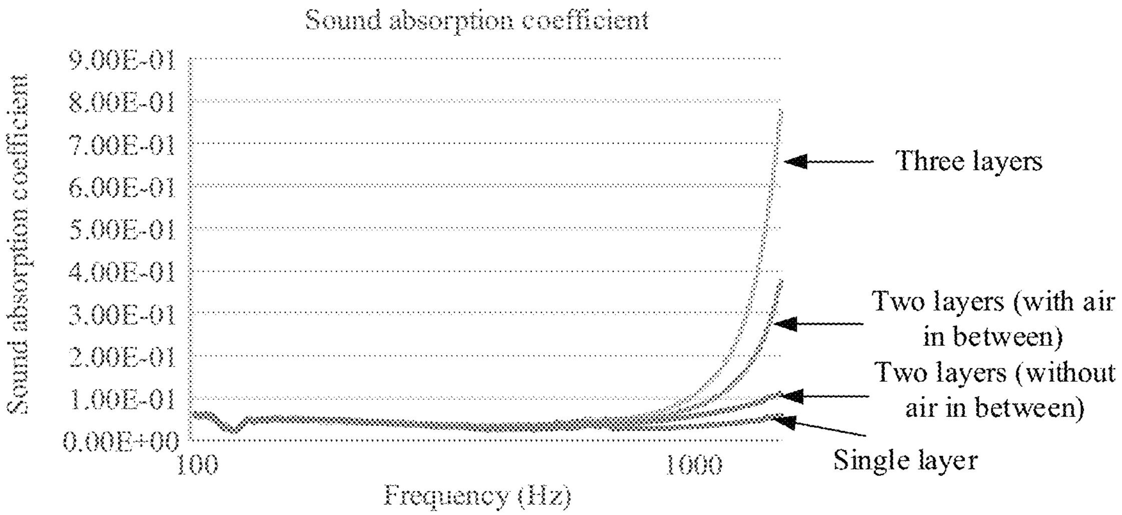

Specifically, when a sound wave propagates, a principle of calculating a transmission loss of the sound wave through the ear pad is as follows:

A sound isolation amount of a single-layer medium follows the law of mass, that is, when a material thickness doubles, a sound isolation amount increases by only 6 dB. A double-layer medium can obtain a higher sound isolation capability by using fewer materials. FIG. 4(*a*) is a schematic diagram of dual-layer transmission of a sound wave through the inner layer and the outer layer of the ear pad. As shown in FIG. 4(*a*), a distance between the inner layer and the outer layer is D, and regardless of thicknesses of the inner layer and the outer layer, mass per unit area of the inner layer and the outer layer is M. In the figure, an interval I is air, II is air or foam, and III is foam. The outer layer of the ear pad is located between the intervals I and II, and the inner layer of the ear pad is located between the intervals II and III. An incident sound wave $p_{1i}$ is reflected and transmitted when passing through the outer layer of the ear pad, a reflected wave $p_{1r}$ returns to the interval I, and a transmitted wave $p_{2t}$ propagates in the interval II. The transmitted wave $p_{2t}$ is reflected and transmitted when passing through the inner layer, a reflected wave per returns to the interval II, and a transmitted wave $p_{3t}$ propagates in the interval III. A transmission lost (TL, transmission loss) of the ear pad including the inner layer and the outer layer is as follows:

$$TL = 10\log_{10}\left|\left(1+\frac{j\omega M}{R_1}\right)\cos kD + j\left[\left(1+\frac{j\omega M}{R_1}\right)-\frac{1}{2}\left(\frac{j\omega M}{R_1}\right)^2\right]\sin kD\right|^2 + rd \tag{1}$$

In the formula (1), ω is an angular frequency, k is a quantity of sound waves in air, R1 is characteristic impedance of air, j is an imaginary unit, r is an attenuation amount during sound wave propagation per unit length of the foam, and d is a thickness of the foam. When $$\frac{\omega M}{R1} \gg 1,$$

the formula (1) may be simplified to the following formula (2) at a medium/high frequency:

$$TL \approx 20\log_{10}\frac{\omega M}{R_1} + 20\log_{10}\frac{\omega M}{2R_1}kD + rd \tag{2}$$

When the ear pad has only the outer layer, an incident sound wave $p_{1i}$ is reflected and transmitted when passing through a medium, a reflected wave $p_{1i}$ returns to the interval I, and a transmitted wave $p_{2t}$ propagates in the interval II. A TL of an outer layer whose thickness is twice the same thickness is as follows:

$$TL = 10\log_{10}\left(1+\left(\frac{\omega M}{R_1}\right)^2\right) \tag{3}$$

When $$\frac{\omega M}{R1} \gg 1,$$

the formula (3) is simplified to the following formula (4):

$$TL \approx 20\log_{10}\frac{\omega M}{R_1} \tag{4}$$

It can be learned, by using the formulas (2) and (4), that a transmission loss, namely, a sound isolation amount, of a dual-layer structure including an inner layer and an outer layer has an obvious advantage at a medium/high frequency compared with that of a single-layer structure.

It is found, through research, that a sound isolation capability of a material is positively correlated with a sound absorption coefficient, that is, a larger TL indicates a stronger sound isolation capability and a larger sound absorption coefficient. A sound absorption coefficient of a raw material is tested by using an impedance tube (refer to the standard ISO 10534-1), and a conclusion consistent with a theory is obtained. As shown in FIG. 4(*c*), sandwiching an air layer with a specific thickness in a double-layer structure including an inner layer and an outer layer has an obvious advantage in a noise absorption capability at a medium/high frequency compared with merely doubling a skin thickness. Therefore, an embodiment of this application provides a noise reduction ear pad. The ear pad has a double-layer structure including an inner layer and an outer layer, and a first medium layer is disposed between the inner layer and the outer layer, to reduce impact of noise in an external environment on sound quality of a headset. An embodiment of this application further provides a headset that includes the noise reduction ear pad. As a layer quantity of an ear pad increases, a sound isolation capability of the ear pad increases, particularly in a medium/high frequency range. The embodiments of this application is described by using, as an example, the ear pad of the double-layer structure including the inner layer and the outer layer, and are also applicable to an ear pad of a structure of more than two layers, for example, three or more layers.

Figure 5:
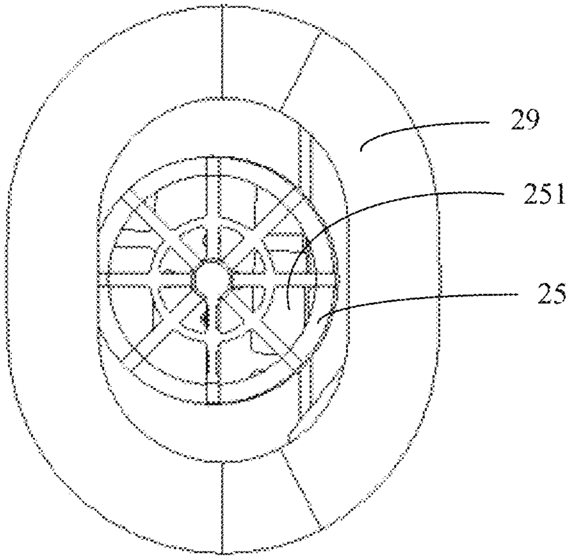
FIG. 5 is a partial top view of an earmuff component according to Embodiment 3 of this application.
Figure 6A:
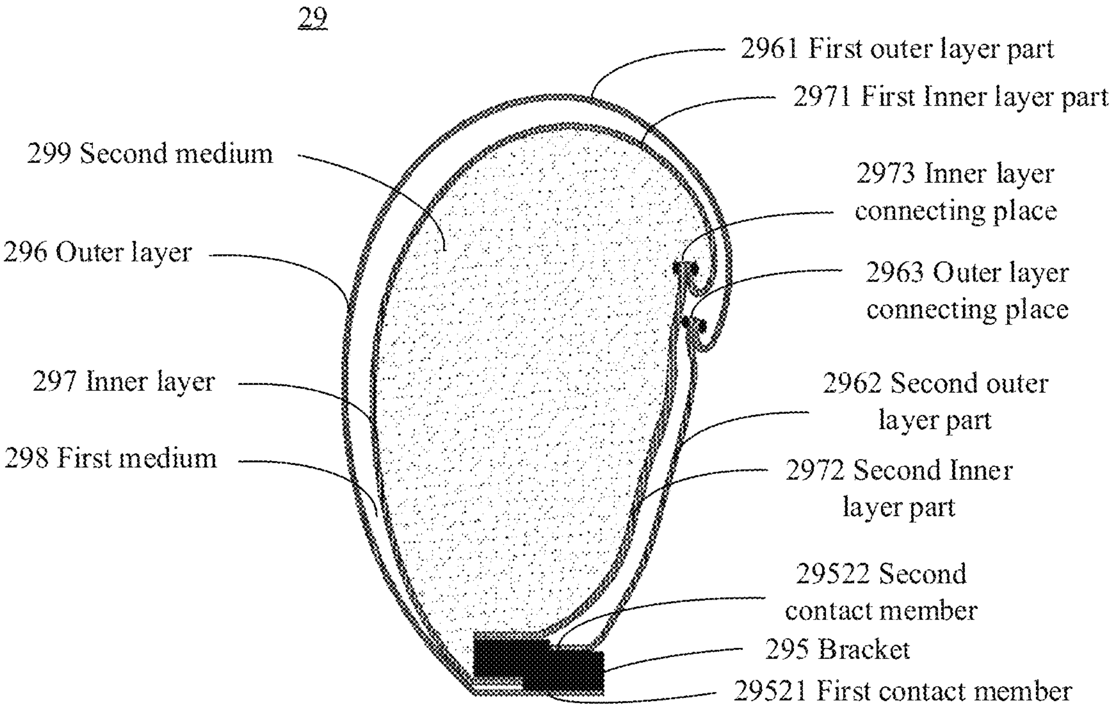
FIG. 6(*a*) to FIG. 6(*e*) are cross-sectional views of ear pads according to Embodiment 4 to Embodiment 7 of this application.
Figure 6B:
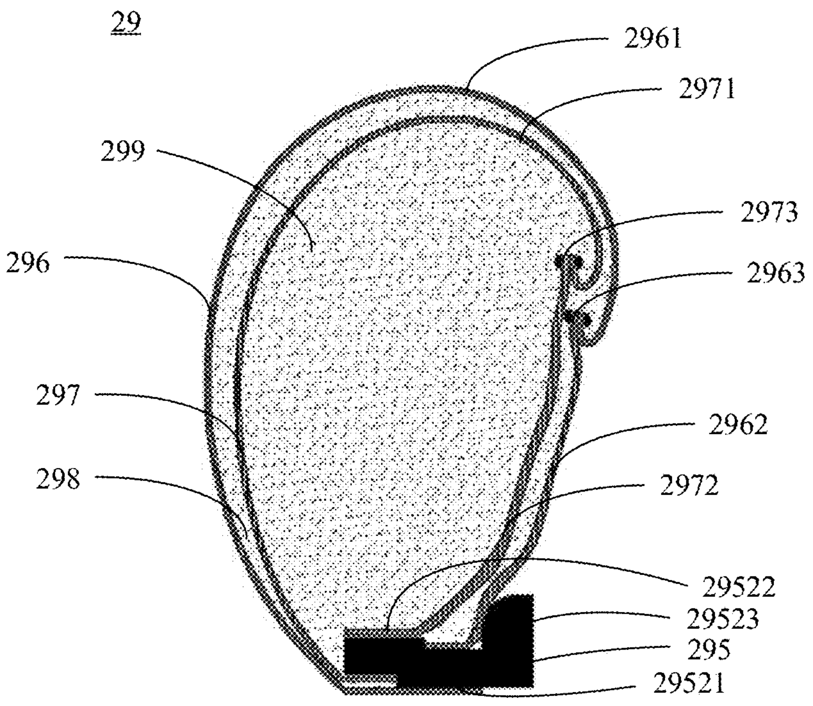
Figure 6C:
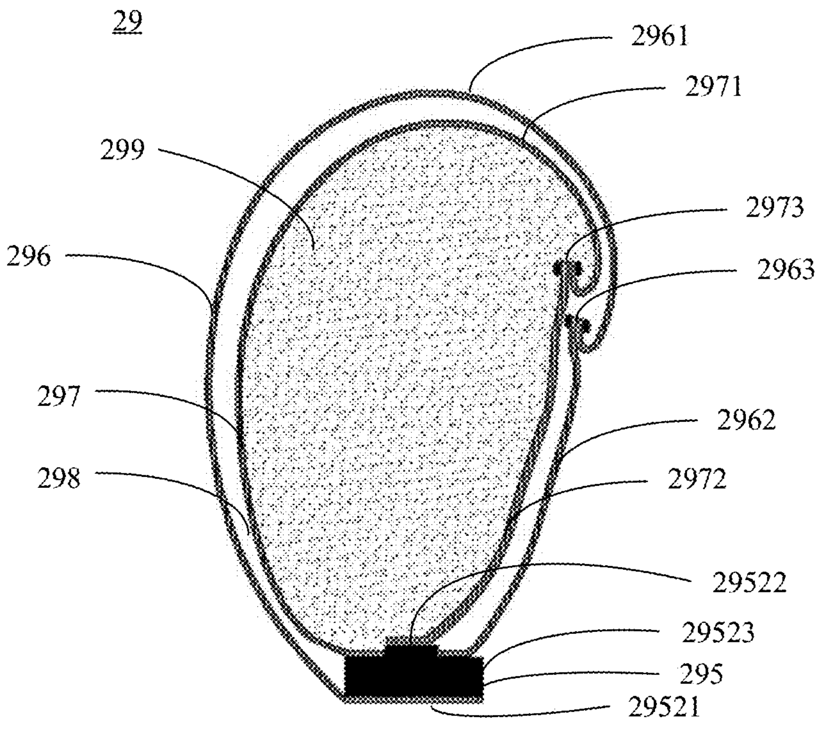
Figure 6D:
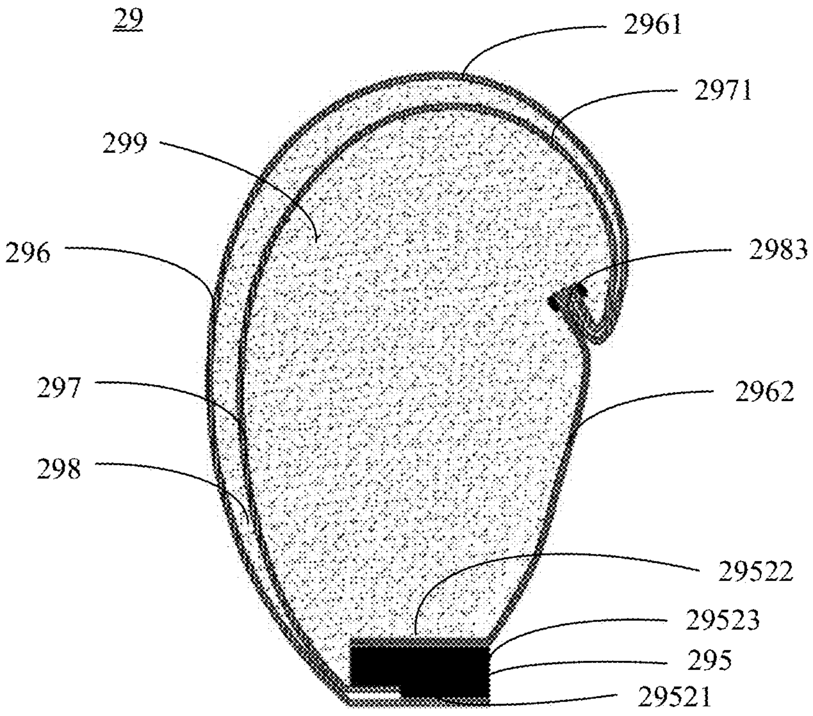
Figure 6E:
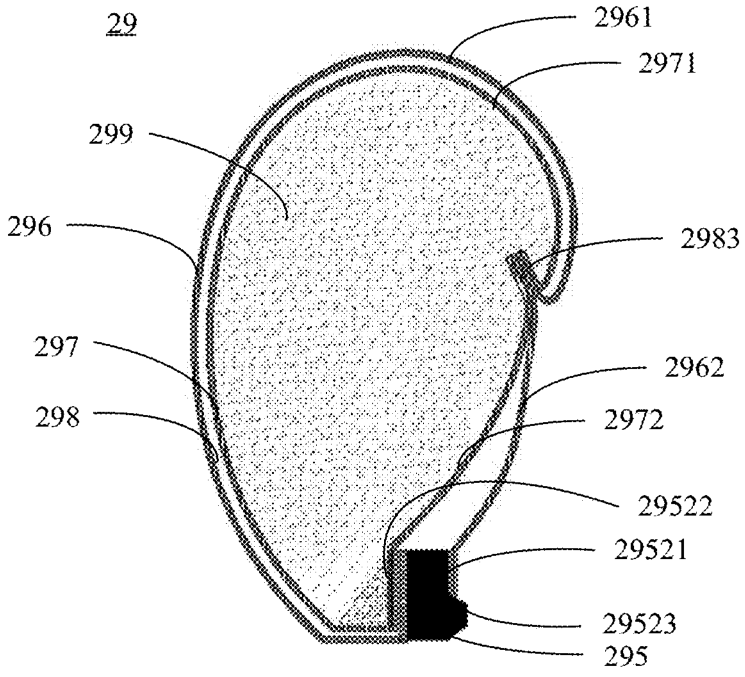

FIG. 5 is a partial top view of an earmuff component according to Embodiment 3 of this application. An ear pad is of an annular structure. Optionally, the ear pad may be of a circular, oval, or square annular structure. As shown in FIG. 5, an annular ear pad 29 surrounds the edge of a sound output port 251 on a barrier plate 25, and an annular middle of the ear pad 29 may be a hollow cavity, or may be a laminar membrane attached to a middle cavity, so that a sound wave can reach the ear of the user through the sound output port, and the ear of the user is also prevented from being in direct contact with the barrier plate, thereby improving visual and audio feelings of the user, and also enhancing comfort.

FIG. 6(*a*) to FIG. 6(*e*) are cross-sectional views of ear pads according to embodiments of this application. In the embodiments of this application, the ear pad may be divided into an outer layer 296, an inner layer 297, a first medium layer 298 between the outer layer and the inner layer, and a second medium layer 299 coated by the inner layer. The outer layer 296, the inner layer 297, the first medium layer 298, and the second medium layer 299 are of a structure obtained through layer-by-layer coating from the outside to the inside. The inner layer and the outer layer are separately annular structures. Optionally, there is one inner layer or there are two or more inner layers, and a medium layer by which every two adjacent layers are separated is a third medium layer. The first medium or the third medium layer may be air, sponge, wool, or the like. Acoustic impedance of the third medium layer is different from acoustic impedance of the inner layer and the outer layer. Optionally, materials of the inner layer and the outer layer are corium, poly urethane leather (PU leather), protein leather, artificial protein leather, cloth, or the like. A material of the inner layer may be the same as or different form a material of the outer layer. The outer layer is in contact with a human skin, and therefore is preferably made of a skin-friendly material. The inner layer is not in direct contact with the human skin, and therefore does not need to be made of a skin-friendly material.

FIG. 6(*a*) is an ear pad according to Embodiment 4 of the present invention. An outer layer of the ear pad is divided into a first outer layer part 2961 and a second outer layer part 2962. Optionally, the outer layer may be divided into more than two parts. An outer layer connecting place 2963 of the first outer layer part and the second outer layer part may be disposed on an inner surface side or an outer surface side of the ear pad. For an aesthetic consideration, the connecting place is usually disposed inside. For a comfort consideration, the connecting place is usually disposed outside. The first outer layer part 2961 and the second outer layer part 2962 also correspondingly cover different areas based on different positions of the outer layer connecting place 2963. When the outer layer connecting place 2963 is located on the inner surface side, an area covered by the first outer layer part 2961 includes a bottom part, the outer surface side, and a top part of the ear pad, and an area covered by the second outer layer part 2962 includes the inner surface side and the bottom part. When the outer layer connecting place 2963 is located on the outer surface side, an area covered by the first outer layer part 2961 includes a bottom part and the outer surface side of the ear pad, and an area covered by the second outer layer part 2962 includes a top part, the inner surface side, and the bottom part.

Similarly, the inner layer of the ear pad is divided into a first inner layer part 2971 and a second inner layer art 2972. Optionally, the inner layer may be divided into more than two parts. An inner layer connecting place 2973 of the first inner layer part 2971 and the second inner layer part 2972 may be disposed on the inside or the outside of the ear pad. A position of the inner layer connecting place 2973 may be designed based on a position of the outer layer connecting place 2963, or may not be designed based on a position of the outer layer connecting place 2963. The first inner layer part 2971 and the second inner layer part 2972 also correspondingly cover different areas based on different positions of the inner layer connecting place 2973. When the inner layer connecting place 2973 is located on the inner surface side, an area covered by the first inner layer part 2971 includes the bottom part, the outer surface side, and the top part of the ear pad, and an area covered by the second inner layer part 2972 includes the inner surface side and the bottom part. When the inner layer connecting place 2973 is located on the outer surface side, an area covered by the first inner layer part 2971 includes the bottom part and the outer surface side of the ear pad, and an area covered by the second inner layer part 2972 includes the top part, the inner surface side, and the bottom part. The first outer layer part 2961 may be connected to the second outer layer part 2962 in a sewing manner, a bonding manner, a hot pressing manner, or the like. Likewise, the first inner layer part 2971 may also be connected to the second inner layer part 2972 in a sewing manner, a bonding manner, a hot pressing manner, or the like. According to the foregoing sound wave propagation principle, acoustic impedance of the first medium layer located between the inner layer and the outer layer is different from acoustic impedance of the outer layer and the inner layer of the ear pad. Therefore, in a propagation process, noise arrives at an ear after passing through a plurality of layers of media. Because of an acoustic impedance mismatch between different media, a reflection capability on a medium interface is enhanced, thereby enhancing sound isolation of the ear pad, and improving a passive noise reduction effect. Specifically, the first medium layer may be air, sponge, wool, or another material, so that the inner layer is not completely attached to the outer layer, and acoustic impedance of a material of the first medium layer is different from the acoustic impedance of the inner layer and the outer layer. Preferably, acoustic impedance of the inner layer or the outer layer is 10 times or more than 10 times the acoustic impedance of the first medium layer. More preferably, the acoustic impedance of the inner layer or the outer layer is 1000 times or more than 1000 times the acoustic impedance of the first medium layer.

As shown in FIG. 2, the bracket 295 includes the fastener 2951 and the contact member 2952. The bottom part 292 of the ear pad may be directly fastened to the housing 21, or may be fastened to the housing by using the bracket 295. The contact member 2952 of the bracket is connected to the inner layer or the outer layer of the ear pad. As shown in FIG. 6(*a*), the contact member 2952 of the bracket is divided into a first contact member 29521 and a second contact member 29522. The first contact member 29521 is separately in contact with the first inner layer part 2971 and the first outer layer part 2961, and the second contact member 29522 is separately in contact with the second inner layer part 2972 and the second outer layer part 2962. Optionally, the first contact member 29521 may be one plane or one step (two planes). When the first contact member 29521 is one plane, the first inner layer part 2971 is in contact with the first contact member 29521 after being fastened (secured) to the first outer layer part 2961, or the first inner layer part 2971 and the first outer layer part 2961 are separately in contact with the first contact member 29521. When the first contact member 29521 includes one step, the first inner layer part 2971 and the first outer layer part 2961 each are in contact with one plane of the first contact member 29521. Because there is a height difference between planes with which the first inner layer part 2971 and the first outer layer part 2961 are in contact, the height difference may control an interval between the first inner layer part 2971 and the first outer layer part 2961, that is, a thickness of the first medium layer 298. It is verified, by using a test, that when an average thickness of the first medium layer does not exceed 24 times a thickness of the inner layer or the outer layer, preferably, when the average thickness of the first medium layer is 0.1 to 10 times the thickness of the inner layer or the outer layer, sound energy is reflected and dissipated on an interface of different media at a high proportion, so that a passive noise reduction effect is the best. Optionally, the second contact member 29522 may be one plane or one step (two planes). When the second contact member 29522 is one plane, the second inner layer part is in contact with the second contact member 29522 after being fastened (secured) to the second outer layer part, or the second inner layer part and the second outer layer part are separately in contact with the second contact member. When the second contact member 29522 includes one step, the second inner layer part and the second outer layer part each are in contact with one plane of the second contact member 29522. Because there is a height difference between planes with which the second inner layer part and the second outer layer part are in contact, the height difference may control an interval between the second inner layer part and the second outer layer part, that is, the thickness of the first medium layer. It is verified, by using a test, that when an average thickness of the first medium layer does not exceed 24 times a thickness of the inner layer or the outer layer, preferably, when the average thickness of the first medium layer is 0.1 to 10 times the thickness of the inner layer or the outer layer, sound energy is reflected and dissipated on an interface of different media at a high proportion, so that a passive noise reduction effect is the best. The first contact member of the bracket or the fastener between the first contact member and the second contact member of the bracket is connected to the front cavity housing 231, the rear cavity housing 241, or the partition plate 27 of the housing 21. FIG. 6(*b*) is a cross-sectional view of an ear pad according to Embodiment 5 of this application. As shown in FIG. 6(*b*), a fastener of a bracket is located in a protrusion member between a first contact member and a second contact member, and a buckle or the like may be disposed on the protrusion member, to be connected to the housing 21. Optionally, in addition to the buckling manner, the bracket 295 may be connected to the housing 21 in a bonding manner, a magnet adsorption manner, a screw fastening manner, or the like.

An inner layer or an outer layer of the ear pad may be connected to the first contact member or the second contact member of the bracket in a hot pressing or bonding manner.

A first inner layer part may be connected to a first outer layer part or a second inner layer part may be connected to a second outer layer part in a bonding manner, hot pressing, or seaming manner.

A second medium layer is filled in an inner area surrounded by the first inner layer part and the second inner layer part. Optionally, the second medium layer is sponge, air, wool, or the like whose acoustic impedance is different from acoustic impedance of the inner layer and the outer layer. Preferably, acoustic impedance of the inner layer or the outer layer is 10 times or more than 10 times acoustic impedance of a first medium layer. More preferably, the acoustic impedance of the inner layer or the outer layer is 1000 times or more than 1000 times the acoustic impedance of the first medium layer.

Optionally, FIG. 6(*c*) is a cross-sectional view of an ear pad according to Embodiment 5 of this application. As shown in FIG. 6(*c*), a second contact member 29522 may be two steps (three planes), and a first contact member 29521 may be one plane. The first contact member 29521 is in contact with a first outer layer part 2961. A second contact member is in contact with the first inner layer part 2971, a second inner layer part 2972, and a second outer layer part 2962, respectively. Because there is a height difference between planes with which the second inner layer part and the second outer layer part are in contact, the height difference may control an interval between the second inner layer part and the second outer layer part, that is, a thickness of a first medium layer. Likewise, an interval between the first inner layer part and the first outer layer part may be adjusted by a distance between a first contact member and a second contact member of a bracket and a plane where the first inner layer part is connected. As described above, it is verified, by using a test, that when an average thickness of the first medium layer does not exceed 24 times a thickness of an inner layer or an outer layer, preferably, when the average thickness of the first medium layer is 0.1 to 10 times the thickness of the inner layer or the outer layer, sound energy is reflected and dissipated on an interface of different media at a high proportion, so that a passive noise reduction effect is the best.

Optionally, the second contact member may be two steps (three planes), and the first contact member may be one plane. The first contact member is in contact with the second outer second part. The second contact member is in contact with the first inner layer part, the second inner layer part, and the first outer layer part, respectively. Because there is a height difference between planes with which the first inner layer part and the first outer layer part are in contact, the height difference may control an interval between the first inner layer part and the first outer layer part, that is, the thickness of the first medium layer. Likewise, an interval between the second inner layer part and the second outer layer part may be adjusted by the distance between the first contact member and the second contact member of a bracket and a plane where the second inner second part is connected. As described above, it is verified, by using a test, that when an average thickness of the first medium layer does not exceed 24 times a thickness of an inner layer or an outer layer, preferably, when the average thickness of the first medium layer is 0.1 to 10 times the thickness of the inner layer or the outer layer, sound energy is reflected and dissipated on an interface of different media at a high proportion, so that a passive noise reduction effect is the best.

Optionally, the first contact member may be two steps (three planes), and the second contact member may be one plane. The first contact member is in contact with the first outer layer part, the second inner layer part, and the second outer layer part. The second contact member is in contact with the first inner layer part. Because there is a height difference between planes with which the second outer layer part and the second inner layer part are in contact, the height difference may control an interval between the second inner layer part and the second outer layer part, that is, a thickness of a first medium layer. Likewise, an interval between the first inner layer part and a first outer layer part may be adjusted by a distance between the second contact member and the first contact member of a bracket and a plane where the first outer layer part is connected. As described above, it is verified, by using a test, that when the average thickness of the first medium layer is 0.1 to 10 times the thickness of the inner layer or the outer layer, sound energy is reflected and dissipated on an interface of different media at a high proportion, so that a passive noise reduction effect is the best Optionally, the first contact member may be two steps (three planes), and the second contact member may be one plane. The first contact member is in contact with the first outer layer part, the first inner layer part, and the second outer layer part. The second contact member is in contact with the second inner layer part. Because there is a height difference between planes with which the first outer layer part and the first inner layer part are in contact, the height difference may control an interval between the first inner layer part and the first outer layer part, that is, the thickness of the first medium layer. Likewise, an interval between the second inner layer part and a second outer layer part may be adjusted by a distance between the second contact member and the first contact member of a bracket and a plane where the second outer layer part is connected. As described above, it is verified, by using a test, that when the average thickness of the first medium layer is 0.1 to 10 times the thickness of the inner layer or the outer layer, sound energy is reflected and dissipated on an interface of different media at a high proportion, so that a passive noise reduction effect is the best FIG. 6(*d*) is a cross-sectional view of an ear pad according to Embodiment 6 of this application. FIG. 6(*d*) shows an ear pad according to Embodiment 2 of the present invention. Different from the ear pads in Embodiment 1, an inner layer in this embodiment includes only a first inner layer part and does not include a second part inner layer part. An outer layer still includes a first outer layer part and a second outer layer part. Optionally, the outer layer may include more than two parts. A connecting place of the first outer layer part, the first inner layer part, and the second outer layer part may be disposed on an inner surface side or an outer surface side of the ear pad. As described above, for an aesthetic consideration, the connecting place is usually disposed inside. For a comfort consideration, the connecting place is usually disposed outside. The first outer layer part and the second outer layer part also correspondingly cover different areas based on different positions of the connecting place. When the connecting place is located on an inner surface side, an area covered by the first outer layer part and the first inner layer part includes a bottom part, the outer surface side, and a top part of the ear pad, and an area covered by the second outer layer part includes the inner surface side and the bottom part. When the connecting place is located on the outer surface side, an area covered by the first outer layer part includes a bottom part and the outer surface side of the ear pad, and an area covered by the second outer layer part includes a top part, the inner surface side, and the bottom part.

The first outer layer part, the second outer layer part and the first inner layer part may be connected in a sewing manner, a bonding manner, a hot pressing manner, or the like. In this embodiment, an interval formed between the first outer layer part and the first inner layer part may fill a first medium layer. According to the foregoing sound wave propagation principle, acoustic impedance of the first medium layer located between the inner layer and the outer layer is different from acoustic impedance of the outer layer and the inner layer of the ear pad. Therefore, in a propagation process, noise arrives at an ear after passing through a plurality of layers of media. Because of an acoustic impedance mismatch between different media, a reflection capability on a medium interface is enhanced, thereby enhancing sound isolation of the ear pad, and improving a passive noise reduction effect. Specifically, the first medium layer may be air, sponge, wool, or another material, so that the inner layer is not completely attached to the outer layer. It is verified, by using a test, that when the average thickness of the first medium layer is 0.1 to 10 times the thickness of the inner layer or the outer layer, sound energy is reflected and dissipated on an interface of different media at a high proportion, so that a passive noise reduction effect is the best As shown in FIG. 6(*d*), contact members of a bracket are divided into a first contact member and a second contact member. Different from Embodiment 1, in this embodiment, the second contact member is connected only to the second outer layer part. The first contact member is in contact with the first inner layer part and the first outer layer part respectively. Optionally, the first contact member may be one plane or one step (two planes). The first contact member may be a plane, and the first inner layer part contacts the first contact member after being fastened (secured) to the first outer layer part, or the first inner layer part and the first outer layer part respectively contact the first contact member. When the first contact member includes a step, the first inner layer part and the first outer layer part are respectively in contact with the plane of the first contact member. Because there is a height difference between planes with which the first inner layer part and the first outer layer part are in contact, the height difference may control an interval between the first inner layer part and the first outer layer part, that is, the thickness of the first medium layer. It is verified, by using a test, that when the average thickness of the first medium layer is 0.1 to 10 times the thickness of the inner layer or the outer layer, sound energy is reflected and dissipated on an interface of different media at a high proportion, so that a passive noise reduction effect is the best. Optionally, the second contact member may be one plane or one step (two planes). The second outer layer part is connected to the second contact member. An inner layer or an outer layer may be connected to the first contact member or the second contact member of the bracket in a hot pressing or bonding manner. A first inner layer part may be connected to a first outer layer part in a bonding manner. The first contact member of the bracket or a fastener between the first contact member and the second contact member of the bracket is connected with a front cavity housing, a rear cavity housing or a partition plate of a housing. The bracket and the housing are connected in a buckling manner, a bonding manner, a magnet adsorption manner, a screw manner, or the like.

FIG. 6(*e*) is a cross-sectional view of an ear pad according to Embodiment 7 of this application. Different from the ear pads in the foregoing Embodiment 4 to Embodiment 6, the plane on which a first contact member and a second contact member of a bracket of the ear pad in Embodiment 7 are located is perpendicular to a plane on which an annular structure of the ear pad is located. A plane in which the first contact member and the second contact member of the bracket of the ear pad according to Embodiments 4 to 6 are located is relatively parallel to a plane in which an annular structure of the ear pad is located. It may be understood that, according to a design requirement, the plane in which the first contact member and the second contact member of the bracket are located may be appropriately inclined to the plane in which the annular structure of the ear pad is located, and a positional relationship between the two planes does not need to be absolutely vertical or parallel. The bracket of the ear pad in Embodiment 7 may also be similar to a structure of the bracket of the ear pad in Embodiment 4 to Embodiment 6. For example, a connection relationship between the first contact member and the second contact member and the inner layer and the outer layer, a quantity of planes respectively included in the first contact member and the second contact member, and a structure of the fixing member of the bracket may all refer to the foregoing embodiments. In other words, based on a relative positional relationship between the plane on which the first contact member and the second contact member of the bracket are located and the plane on which the annular structure of the ear pad is located, a connection manner of other components of the ear pad and the bracket is adjusted. Optionally, each part of the inner layer and each part of the outer layer may be separately connected to a connecting place. Alternatively, as shown in FIG. 6(*e*), a first inner layer part, a second inner layer part, a first outer layer part, and a second outer layer part are jointly connected to a same connecting place 2983.

In the descriptions of this application, it should be understood that a relative position relationship indicated by the term such as "center", "upper", "lower", "front", "back", "left", "right", "vertical", "horizontal", "top", "bottom", "inside", or "outside" is a relative position relationship that exists between components when the components are placed at an angle shown in an accompanying drawing. The components may be placed at another angle.

The term "first", "second", or "third" is merely used to distinguish between similar components or structures, and does not indicate relative importance between or quantities of components or structures. In descriptions of this application, unless otherwise stated, "a plurality of" means "at least two".

In the descriptions of this application, it should be noted that, unless otherwise clearly specified and limited, the term "installation", "interconnection", or "connection" should be understood in a broad sense, for example, may be a fixed connection, a detachable connection, or an integral connection; or may be a direct interconnection, or may be an indirect interconnection performed by using an intermediate medium.

What is claimed is:

1. An ear pad, comprising:

an inner layer and an outer layer overlying the inner layer, the inner layer and the outer layer being configured as separate closed annular structures and arranged such that the inner layer and the outer layer are separated by a first medium layer, and a second medium layer is separated from the first medium layer by the inner layer, the inner layer coating the second medium layer; and acoustic impedance of the first medium layer is different from acoustic impedance of the inner layer and the outer layer, wherein a thickness of the first medium layer does not exceed 10 times a thickness of the inner layer or a thickness of the outer layer.

2. An ear pad, comprising:

an inner layer and an outer layer overlying the inner layer, the inner layer and the outer layer being configured as separate closed annular structures and arranged such that the inner layer and the outer layer are separated by a first medium layer, and a second medium layer is separated from the first medium layer by the inner layer, the inner layer coating the second medium layer; and acoustic impedance of the first medium layer is different from acoustic impedance of the inner layer and the outer layer, wherein the ear pad is provided with two or more inner layers arranged such that every two adjacent inner layers are separated by a third medium layer.

3. The ear pad according to claim 2, wherein the first medium layer is air or foam.

4. The ear pad according to claim 2, wherein the third medium layer is air or foam.

5. An earmuff component, comprising:

a housing; and an ear pad, the ear pad having a bottom part secured to the housing and having an annular structure, the ear pad comprising an inner layer and an outer layer covering the inner layer, the inner layer and the outer layer being separate closed annular structures;

the inner layer and the outer layer being separated by a first medium layer, a second medium layer being separated from the first medium layer by the inner layer, the inner layer coating the second medium layer; and acoustic impedance of the first medium layer being different from acoustic impedance of the inner layer and the outer layer.

6. The ear pad according to claim 5, further comprising a bracket, the bracket comprising a contact member positioned so as to physically contact one of the inner layer or the outer layer.

7. The ear pad according to claim 6, wherein the inner layer or the outer layer is in contact with the contact member of the bracket in a hot pressing or bonding manner.

8. The ear pad according to claim 5, wherein acoustic impedance of the inner layer or the outer layer is at least 10 times the acoustic impedance of the first medium layer.

9. The ear pad according to claim 5, wherein acoustic impedance of the inner layer or the outer layer is at least 1,000 times the acoustic impedance of the first medium layer.

10. The ear pad according to claim 5, wherein the outer layer comprises a first outer layer part and a second outer layer part, at least a portion of the first outer layer part or the second outer layer part covering the inner layer.

11. The ear pad according to claim 5, wherein the outer layer comprises a first outer layer part and a second outer layer part, the inner layer comprises a first inner layer part, the first outer layer part covering the first inner layer part.

12. The ear pad according to claim 5, wherein the outer layer comprises a first outer layer part and a second outer layer part, the inner layer comprises a first inner layer part and a second inner layer part, the first outer layer part covering the first inner layer part, and the second outer layer part covering the second inner layer part.

13. The earmuff component of claim 5, the earmuff component being part of a headset comprising:

a headband having two ends; and a headset having at least two receiving ends connected to respective ones of the two ends of the headband, each of the headset receiving ends including the earmuff component of claim 5.

14. The headset according to claim 13, wherein each ear pad further comprises a bracket, the bracket comprising a contact member in contact with one of the inner layer or the outer layer.

15. The headset according to claim 13, wherein acoustic impedance of the inner layer or the outer layer is at least 10 times the acoustic impedance of the first medium layer.

16. The headset according to claim 13, wherein acoustic impedance of the inner layer or the outer layer is at least 1,000 times the acoustic impedance of the first medium layer.

17. The headset according to claim 13, wherein the outer layer comprises a first outer layer part and a second outer layer part, at least a portion of the first outer layer part or the second outer layer part covering the inner layer.

18. The headset according to claim 13, wherein the outer layer comprises a first outer layer part and a second outer layer part, the inner layer comprises a first inner layer part, and the first outer layer part covers the first inner layer part.

19. An earmuff component, comprising:

an ear pad; and a housing;

the ear pad comprising an inner layer, an outer layer, and a bracket including a fastener, the inner layer and the outer layer being secured to one of a front cavity wall, a rear cavity wall, or a partition plate of a headset by the fastener bracket;

wherein the ear pad is of an annular structure comprising an inner layer and an outer layer covering the inner layer, the inner layer and the outer layer being separate annular structures;

the inner layer and the outer layer being separated by a first medium layer, a second medium layer being provided that is coated by the inner layer; and acoustic impedance of the first medium layer is different from acoustic impedance of the inner layer and the outer layer.

* * * * *